United States Patent [19]

Bergquist

[11] 4,192,528
[45] Mar. 11, 1980

[54] SPRING-SUSPENDED BOGIE WITH TWO OR MORE WHEEL AXLES

[75] Inventor: Lennart Bergquist, Oxelösund, Sweden

[73] Assignee: Volvo BM AB, Eskilstuna, Sweden

[21] Appl. No.: 869,864

[22] Filed: Jan. 16, 1978

[30] Foreign Application Priority Data

Jan. 19, 1977 [SE] Sweden .................................. 7700522

[51] Int. Cl.$^2$ .................................................. B60G 5/00
[52] U.S. Cl. .................................... 280/677; 280/680
[58] Field of Search ............... 280/677, 678, 679, 680, 280/681, 81 R

[56] References Cited

U.S. PATENT DOCUMENTS

| 2,193,567 | 3/1940 | Pointer | 280/681 |
| 2,760,784 | 8/1956 | Talbert | 280/680 |
| 3,933,367 | 1/1976 | Tamas | 280/680 |
| 4,082,316 | 4/1978 | Raidel | 280/687 |

*Primary Examiner*—Philip Goodman
*Attorney, Agent, or Firm*—Wenderoth, Lind & Ponack

[57] ABSTRACT

The invention relates to a bogie for vehicles of the type which has at least two movable axles against which the chassis of the vehicle rests over an equalizing beam arranged on either side of the chassis, the vertical forces being transmitted between the wheel axles and the equalizing beams by transmitting devices which are rigid when biased by tension and pressure stresses but yieldable to bending and shearing stresses. The connection points for these transmitting devices, at least at one axle, are located at a distance from the axle on a member which is rigidly connected to the axle, and a spring is arranged at such member to compensate for the moment conditioned by the distance between the axle and the connection points and resulting from movement of the axle.

14 Claims, 15 Drawing Figures

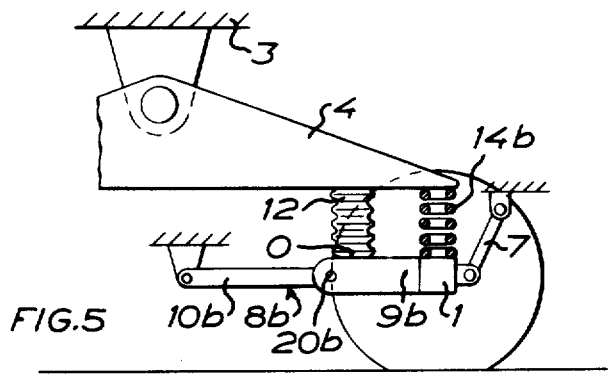
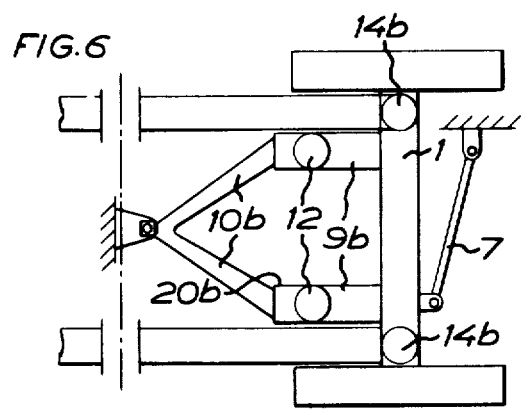
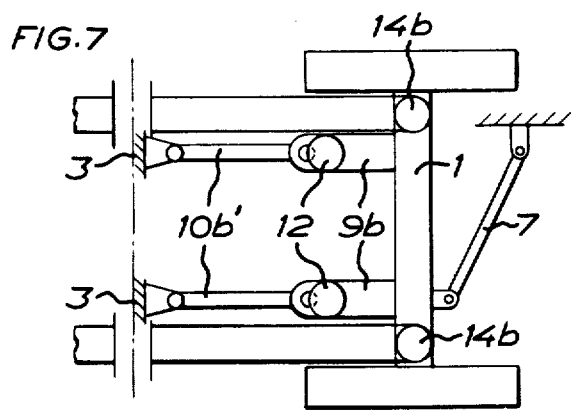

SPRING-SUSPENDED BOGIE WITH TWO OR MORE WHEEL AXLES

BACKGROUND OF THE INVENTION

The present invention relates to a vehicle truck or bogie with two or more wheel axles, comprising at least one pair of balance beams or equalizing means in the form of two-armed levers pivotally mounted to the chassis of the vehicle, the balance beams being connected to at least one of the wheel axles by interconnecting means adapted to transmit vertical forces, such means being rigid when biased by tension or pressure stresses but yieldable to bending or shearing stresses.

The stability of a vehicle is dependent on its resistance to swaying. The demand for sway-resistant suspension is accentuated in vehicles with soft tires. Such tires are used in connection with cross-country vehicles. Driving on rough ground requires a diagonal bogie motion which is relatively free from resistance.

The main problem is to make a spring suspended bogie so formed that it will be sway-proof but still effect diagonal bogie motion free from resistance.

The wheel axles should thus permit relative angular setting without the bogie as a whole being influenced thereby so as to cause exaggerated swaying of the vehicle. The invention is directed to bogies, not only to those intended for vehicles of the type mentioned above but for any kind of vehicle, especially articulated vehicles involving swaying problems.

So far the following solutions have been suggested.

Separate stabilizers may be arranged for every single axle. The result is, however, that diagonal bogie motion will be highly impeded or prevented.

One axle may be resistant and the other axle yieldable to swaying. The result of this is that the bogie effects aimed at will be lost at least partly and that the vehicle, when inclining laterally, will behave as a single-axle vehicle.

A very broad spring centre, i.e. a large interval between the springs, may be provided. For practical reasons and for consideration of space this is impossible in most cases.

Finally, the axle or bogie may be provided with very rigid springs. This, however, gives undesired effects from the point of view of comfort and will make the vehicle—especially in the unloaded condition—behave as an unsuspended vehicle.

External stabilizers, which, for instance, are switchable between different working zones, may also be provided, but these are complicated and would render the construction more expensive.

SUMMARY OF THE INVENTION

The essential characteristic of the bogie according to the invention is that a member rigidly connected to one wheel axle includes at least two connection points for the interconnecting means, such connection points lying in a plane parallel to the wheel axle and longitudinally of the vehicle chassis independently of the position of the axle, that a line joining the two connection points lies in a plane transverse of the vehicle chassis remote from a corresponding plane along the wheel axle, and that at least one spring means is arranged to compensate for the moment acting around the joining line and resulting from the distance between the two remote planes.

BRIEF DESCRIPTION OF THE DRAWINGS

Examples of various modifications of the bogie according to the invention will be given hereinbelow with reference to the accompanying drawings, wherein:

FIGS. 5 and 6 are views similar to FIGS. 1 and 2, but showing a further embodiment of the present invention;

FIG. 7 is a view similar to FIG. 6 but illustrating a variation thereof;

DETAILED DESCRIPTION OF THE INVENTION

Figure 1:
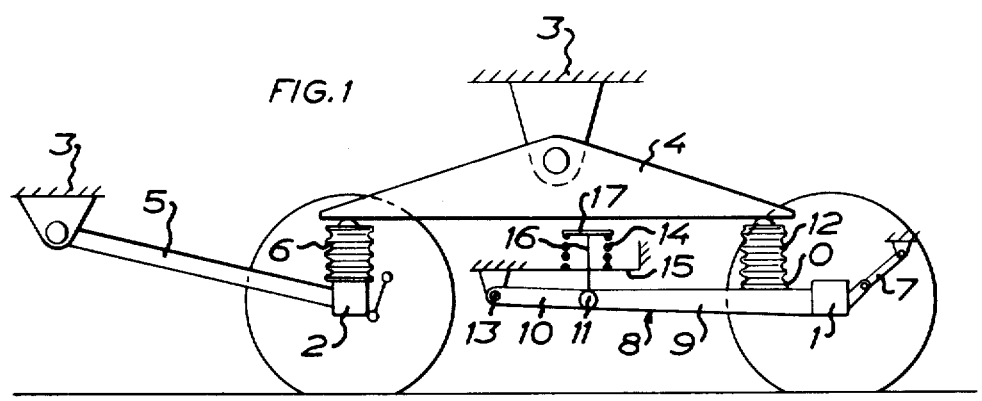
FIGS. 1 and 2 are schematic side and plan views, respectively, of a first embodiment of the invention.

In the following specification and in the drawings, details that are structurally and functionally identical will be designated by like reference numerals, while details that have similar function but are structurally different are distinguished by index letters placed after the reference numerals.

All the bogies illustrated have a rear axle 1 and a front axle 2. For the sake of simplicity the front axle has been shown in FIGS. 1 and 2 only. Mounted on the chassis 3, which is illustrated in rough outline only, is a pair of balance beams or equalizing means 4. The balance beams transmit, in cooperation with means to be described below, vertical forces between the chassis 3 and the axles 1 and 2. The front axle 2 is connected with the chassis by means of a rigid triangular rod 5 which is spherically articulated to the chassis and adapted to transmit horizontal forces, and axle 2 supports the front ends of the balance beams 4 by means 6 which are rigid when biased by tension or pressure stresses but which are yieldable to bending or shearing stresses. The means 6 will thus transmit the vertical forces between balance beams 4 and the front axle 2.

According to the invention, for at least at one of the axles of the bogie, the means which are adapted to transmit vertical forces between the balance beam ends and the axle and which are rigid when biased by tension or pressure stresses but yieldable to bending or shearing stresses, are spaced from the axle longitudinally of the bogie, and the moment resulting from the relative movement between the axle and the balance beams is intended to be compensated for by one or more spring means. The vertical planes through the line joining the means transmitting the vertical forces and through the wheel axle will thus not coincide.

From a constructional point of view the problem of connecting the axle 1 with the balance beams 4 via the means transmitting vertical forces so as to obtain a springing moment may be solved in various ways.

Figure 2:
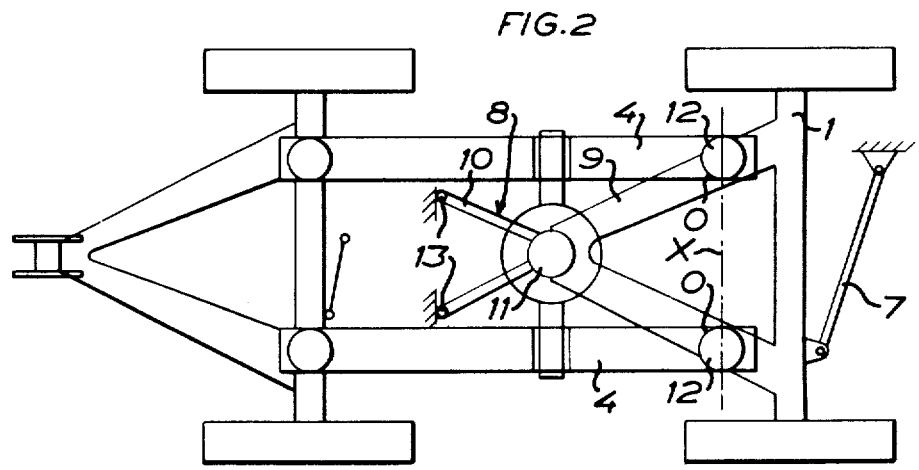

In the drawings, 1 designates the rear axle of a bogie. To prevent lateral movement the axle 1 is connected in a per se known manner with the vehicle chassis 3 by means of an inclined tie rod 7 and this tie rod extends from one end of the axle to a bracket positioned on the chassis at the opposite side of the vehicle. The axle 1 is connected with the chassis by means of a rod assembly 8 adapted to transmit horizontal forces. In the embodiment of FIGS. 1 and 2 the rod assembly comprises a rear member 9 and a front member 10 which are interconnected by means of a joint 11 which permits relative spherical movement. The rear member 9 is rigidly secured to the axle 1 and provided, between this axle and the spherical joint 11, with abutments or seats O for the means 12 transmitting the vertical forces.

The front member 10 is pivotally connected to the vehicle chassis 3 and is adapted to pivot about an axis 13 positioned transversely of the vehicle chassis.

When the axle moves in the vertical direction the rear member 9 of assembly 8 will pivot about an axis X through the connection points O of means 12 so that the assembly 8 will bend at the joint 11.

A spring means 14 is so arranged at joint 11 that it will counteract bending movements between the members 9 and 10 of assembly 8. In the embodiment of FIGS. 1 and 2 the spring means comprises a compression spring which is clamped between a seat 15 connected with the chassis and an abutment 17 connected with the joint 11 by means of a draw-bar 16. If the axle 1 moves upwardly that portion of the rear member 9 which is situated in front of the connection points for the means 12 will pivot downwardly and the spring 14 will be compressed.

The rear end of the balance beam or beams 4 will swing upwardly or downwardly by spring action when one or both wheels pass a bump. The movement of the balance beam or beams will act upon the front axle 2 so that this will be displaced in the opposite direction, which results in an equalizing effect upon the wheel movements.

By the arrangement of interconnected axles 1 and 2 and a spring means provided at one axle, both axles will be suspended at the same time as the compensation in height of the relative position of the axles is obtained in the vertical sense.

As both axles can pivot about an axis positioned along the centre line of the chassis the axles may effect a diagonal movement with maintained spring action, i.e. the axles form an angle to each other without any swaying movement in one direction or the other. This applies to all the embodiments.

Figure 3:
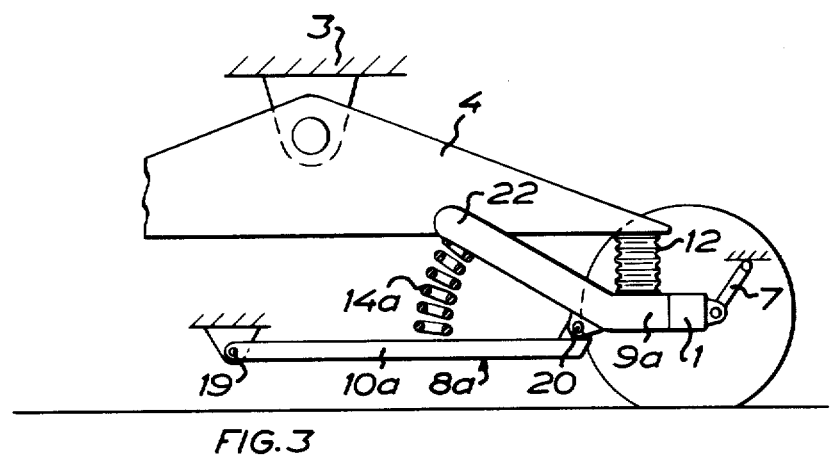
FIGS. 3 and 4 are views similar to FIGS. 1 and 2, but showing a further embodiment of the invention.
Figure 4:
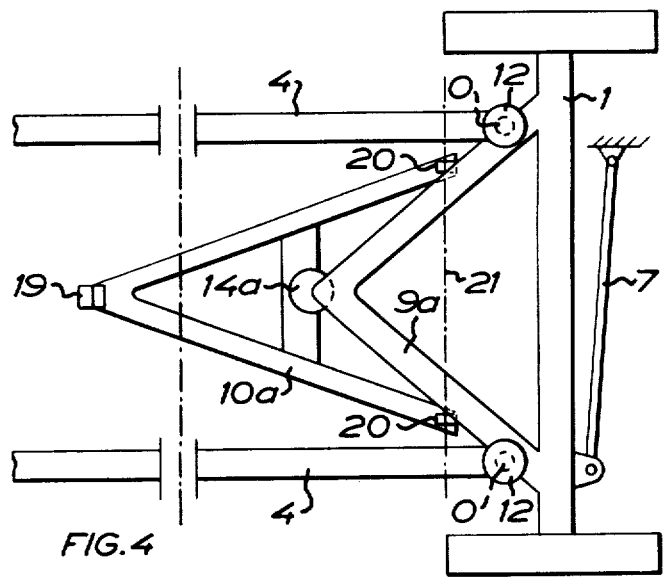

FIGS. 3 and 4 illustrate a different embodiment of the rod assembly 8a transmitting the horizontal forces. The rear member 9a is, again, rigidly secured to the axle 1. The front member 10a, however, is connected to the chassis 3 by means of a spherical bearing 19. The rear member and the front member are interconnected by means of a pair of joints 20 so that both these members can pivot relative to each other about an axis 21 which is parallel with the axle 1. At the rear member 9a, where abutments are arranged forming the connection points O for the means transmitting the vertical forces, is a projection 22 which extends over the front member 10a. Arranged at the end of this projection 22 and an underlying part of the front member 10a are seats for the spring means 14a. When the wheel axle moves in a vertical direction, the assembly 8a will bend, so that the projection in this case will approach the front member 10a against the action of the spring 14a.

In the embodiment according to FIGS. 5, 6 and 7 a rear member 9b is, as before, rigidly secured to the axle 1 and abutments or connection points O for the means 12 transmitting the vertical forces are arranged on member 9b. The front member may consist of a V-shaped rod 10b which is spherically articulated to the chassis 3 and pivotally connected to the rear member 9b at 20b (FIG. 6). However, the V-shaped rod 10b may be replaced by a pair of links 10b' which are spherically mounted to the chassis 3 and to the rear member 9b (FIG. 7).

The embodiments previously described in conjunction with FIGS. 1–4 have a centrally arranged spring means 14 and 14a. In FIGS. 5–7, however, there is a spring 14b at either end of the axle 1 which is clamped between the axle 1 and the rear end of the respective balance beam 4. The movement pattern of the spring will be substantially the same as before. When the axle 1 moves upwardly the assembly 8b formed of the members 9b and 10b or 10b', respectively, will bend and the spring means 14b will counteract this movement.

Figure 8:
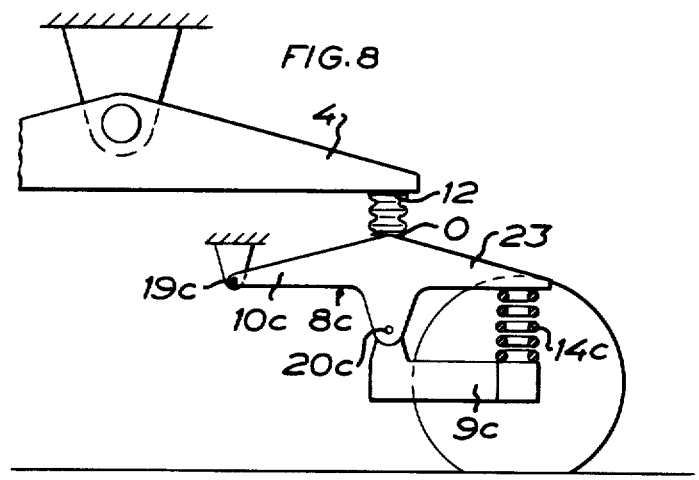
FIGS. 8 and 9 are views similar to FIGS. 1 and 2, but showing an even further embodiment of the present invention.
Figure 9:
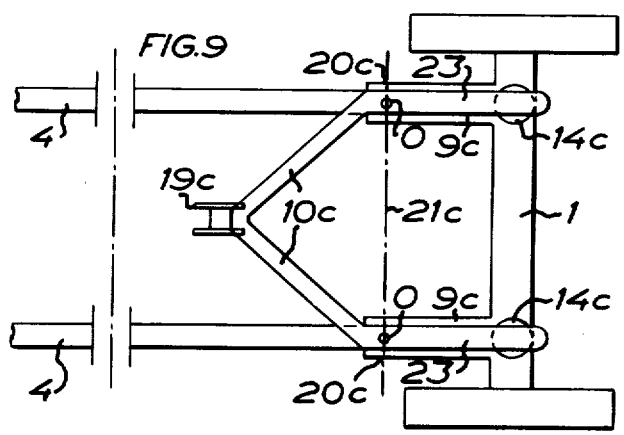

FIGS. 8 and 9 show an embodiment in which the rear member 9c of an assembly 8c, comprising a rear and a front member 9c and 10c, respectively, is rigidly secured to the axle 1, while the front member 10c is articulated to the chassis 3 by means of a spherical bearing 19c. The rear and front members 9c and 10c are interconnected by means of joints 20c so that they can pivot about an axis 21c.

In this embodiment the connection points or abutments O for the means 12 transmitting the vertical forces are positioned at the front member 10c, as distinguished from the connection points or abutments previously described, and the front member 10c is so formed that the abutments will be offset in a direction whereby they will be substantially adjacent to the axis 21c between the front and rear members 9c, 10c. In this connection there is also arranged a pair of springs 14c placed at the ends of the wheel axle 1 and clamped between this axle and backwardly directed projections 23 of the front member 10c of the assembly.

Figure 10:
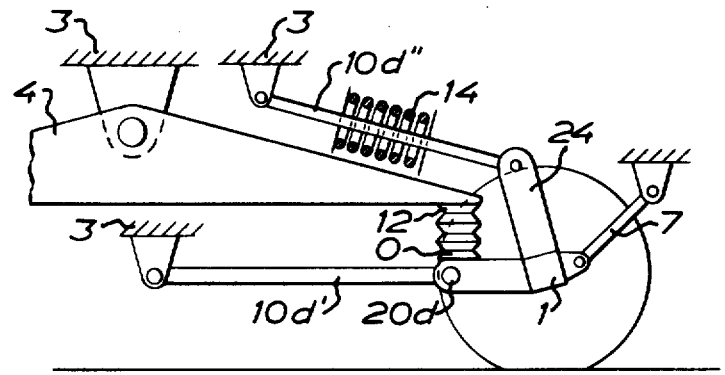
FIGS. 10 and 11 are views similar to FIGS. 1 and 2, but showing an even further embodiment of the present invention.
Figure 11:
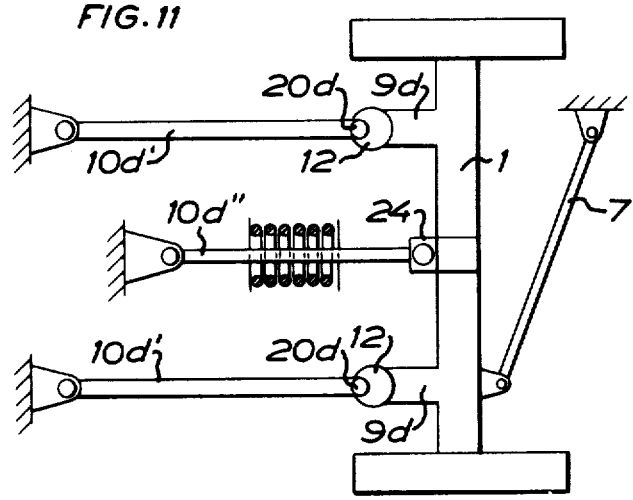

In the embodiments according to FIGS. 10 and 11 a so-called moment rod is utilized and, in analogy with the embodiment according to FIG. 7, the front member of the assembly is replaced by a pair of links 10d', which are articulated with the rear member 9d of the assembly as well as with the vehicle chassis 3, and a rod 10d" which is pivotally mounted between a projection 24 at the rear member 9d and the chassis 3 and telescopically retractable against the action of a spring means 14d.

Connection points or abutments O for the means 12 transmitting the vertical forces are positioned at or close to the joints 20d between the rear member 9d of the assembly and the links 10d'.

Figure 12:
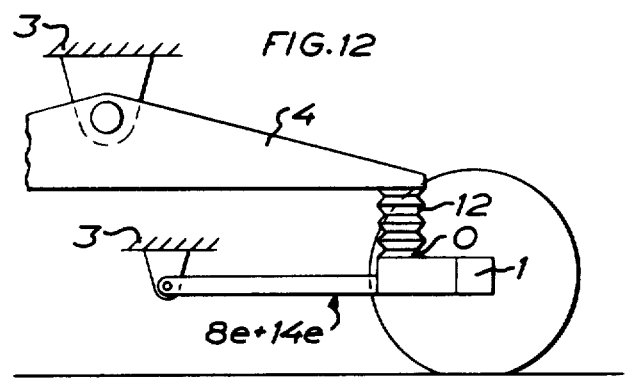
FIGS. 12 and 13 are views similar to FIGS. 1 and 2, but showing a yet further embodiment of the present invention.
Figure 13:
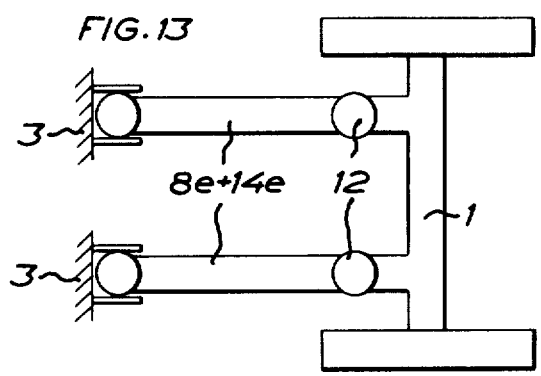
Figure 14:
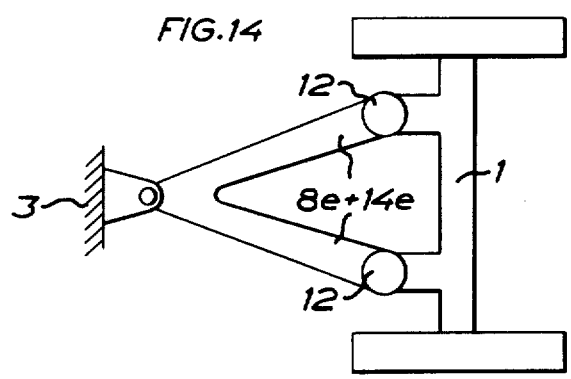
FIG. 14 is a view similar to FIG. 13, but showing a variation thereof.

In the embodiment of FIGS. 12, 13 and 14 a pair of leaf spring means form the assembly as well as the spring means, instead of using an assembly formed of two or more members cooperating with a separate spring means. A pair of leaf springs, designated 8e+14e, are rigidly secured to the axle 1 and spherically articulated to the chassis 3. Between the ends of the leaf springs are connection points or abutments O for the means 12 transmitting the vertical forces. To avoid torsional stresses upon the leaf spring means it is important that the joints of these means on the chassis 3 permit spherical movement.

Figure 15:
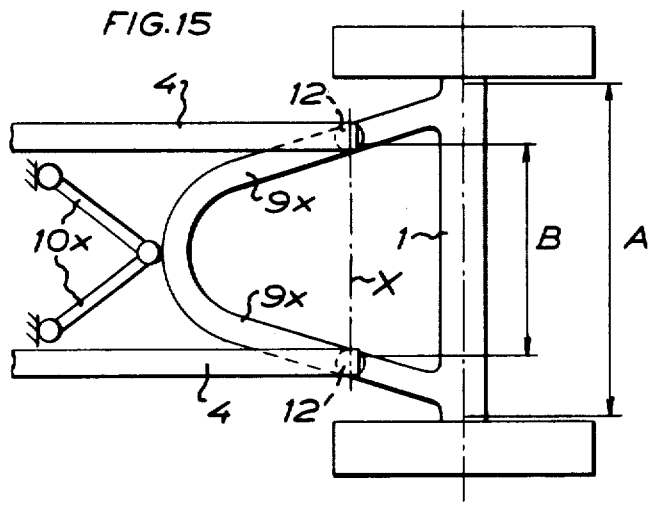
FIG. 15 is a schematic plan view illustrating the principle of the present invention.

FIG. 15 illustrates how the position of the connection points O for the means 12 transmitting the vertical forces influences the possibilities of vertical movement of the wheel axle. By allowing means 12 to engage a rear member 9x of the assembly, which is rigidly connected to the axle 1, in front of the wheel axle 1, it will be possible to allow a large vertical movement of the axle while maintaining a moderate angular movement, i.e. a rotational movement about the longitudinal axis of the vehicle or an axis parallel therewith. As a result of the described arrangement of the wheel suspension, the theoretical distance between the points relative to which the axle springs will be moved from the end points of line B to the end points of line A.

It is obvious that further modifications of the invention are feasible. Also the various details may be modified.

Thus, for example, the means 12 transmitting the vertical forces may consist of links or rods spherically mounted at both ends, but they may also consist of elements of rubber or the like which are substantially rigid when biased by tension or pressure stresses but yieldable to bending or shearing stresses.

Provided that the attachments are altered, the spring means counteracting the relative movement of the parts of the assembly may also, in addition to compression springs, consist of tension springs, rubber springs, gas pressure springs or the like.

The invention should thus not be considered limited to the embodiments described above and illustrated in the schematic drawings but may be modified in various ways within the scope of the appended claims.

What we claim and desire to secure by Letters Patent is:

1. A vehicle truck or bogie comprising:
   a chassis having associated therewith at least first and second wheel axles;
   at least one pair of balance beams pivotally mounted on said chassis, each said beam having longitudinally spaced first and second ends, said beams being laterally spaced;
   interconnecting means, connecting each of said first and second axles to laterally spaced first and second ends of said beams, respectively, for transmitting vertical forces therebetween;
   a flexible unit rigidly connected to said first axle and pivotally connected to said chassis;
   at least said interconnecting means connecting said first axle to said first ends of said beams comprising substantially vertically extending elements of a construction which are rigid when subjected to substantially vertically directed stresses, but which are flexible and yieldable when subjected to substantially horizontally directed stresses;
   said elements being supported by said flexible unit at points thereon which are longitudinally spaced from said first axle, such that a first imaginary vertical plane through said first axle is longitudinally spaced from a second imaginary vertical plane through said points;
   said first axle, upon vertical movement thereof, being pivotable about an imaginary straight line connecting said points, thereby causing flexing of said flexible unit; and
   spring means associated with said flexible unit for counteracting said flexing of said flexible unit.

2. A bogie as claimed in claim 1, wherein said flexible unit comprises a first member rigidly connected to said first axle, and a second member pivotably connected to said first member and to said chassis.

3. A bogie as claimed in claim 2, wherein said first member is triangular shaped, and said second member is spherically coupled to said first member and pivoted to said chassis about a transverse axis.

4. A bogie as claimed in claim 3, wherein said spring means acts between said chassis and said flexible unit.

5. A bogie as claimed in claim 2, wherein said first member is triangular shaped, and said second member is spherically coupled to said chassis and pivoted to said first member about a transverse axis.

6. A bogie as claimed in claim 5, wherein said spring means acts between said first and second members.

7. A bogie as claimed in claim 2, wherein said second member comprises a pair of links, each said link being spherically coupled at a first end thereof to said chassis and spherically coupled at a second end thereof to said first member.

8. A bogie as claimed in claim 2, wherein said second member is triangular shaped and is spherically coupled to said chassis and pivoted to said first member about a transverse axis.

9. A bogie as claimed in claim 8, wherein said spring means acts between said first axle and said first ends of said beams.

10. A bogie as claimed in claim 8, wherein said spring means acts between said first axle and second member.

11. A bogie as claimed in claim 2, wherein said spring means acts between said first axle and said chassis.

12. A bogie as claimed in claim 11, wherein said flexible unit comprises flexible leaf spring means having a first end rigidly fixed to said first axle and a second end spherically coupled to said chassis.

13. A bogie as claimed in claim 1, further comprising a rigid triangular shaped unit rigidly connected to said second axle and spherically coupled to said chassis, and wherein said interconnecting means connecting said second ends of said beams comprises further vertically extending elements of a construction which are rigid when subjected to substantially vertically directed stresses, but which are flexible and yieldable when subjected to substantially horizontally directed stresses.

14. A bogie as claimed in claim 1, wherein said points are located longitudinally in front of said first axle, taken in the primary direction of movement of said bogie.

* * * * *